Patented Jan. 25, 1949

2,459,817

UNITED STATES PATENT OFFICE 2,459,817

2-(4' CARBOXY-BUTYL)-3:4-DI(ACYLAMIDO)-4:5 DIHYDROTHIOPHENE AND ITS ESTERS

Stanton A. Harris, Westfield, and Glen E. Arth, Rahway, N. J., assignors to Merck & Co., Inc., Rahway, N. J., a corporation of New Jersey No Drawing. Application September 16, 1944, Serial No. 554,454

8 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

$$\begin{array}{c} \text{O} \\ \parallel \\ \text{HN—C—NH} \\ | \quad\quad | \\ \text{HC———CH} \\ | \quad\quad | \\ \text{H}_2\text{C—S—CHCH}_2\text{CH}_2\text{CH}_2\text{CH}_2\text{CO}_2\text{H} \end{array}$$

It is now found that this compound can be synthesized by reactions indicated as follows:

(Reaction scheme showing compounds (1) through (9a), (9b), and (10) through (12))

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethylmercapto-propanoic acid (2); which is then treated with an acylating agent, such as an acyl halide, in an aqueous alkaline solution to yield 2-acylamido-3-carboxymethylmercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxybutanal ester in a lower aliphatic alcohol reaction medium containing piperidine and a lower aliphatic carboxylic acid, produces 2-(4'-carboalkoxy-butylidene)-3-keto-4-acylamidotetrahydrothiophene (7). This product, when reacted with hydroxylamine yields an ester of the corresponding oxime, 2-(4'-carboxy-butylidene)-3-isonitroso-4-acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acylamido)-tetrahydrothiophene ester (9a) and 2-(4'-carboxy-butyl)-3:4-di(acylamido)-4:5-dihydrothiophene ester (9b).

This equilibrium mixture, or if preferred, one of the equilibrants, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy - butyl) - 3:4 - diamino - tetrahydrothiophene (11) which, when reacted with a carbonyl halide, produces the compound 2-(4'-carboxy-butyl) - 3:4 - ureido - tetrahydrothiophene. This product is obtained as a mixture of stereoisomers, one of which is racemic biotin, from which upon resolution, is obtained the dextrorotatory isomer, biotin.

This invention is concerned with the intermediates numbered 9a and 9b above, namely 2-(4' - carboxy - butylidene) - 3:4 - di(acylamido)-tetrahydrothiophenes and their equilibrants, 2-(4' - carboxy - butyl) - 3:4 - di(acylamido) - 4:5-dihydrothiophene, together with esters of each of the equilibrants represented by the formulae:

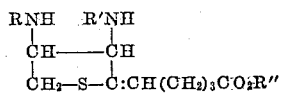

and

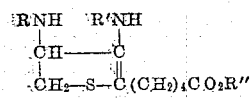

wherein R and R' are acyl groups and R'' is of the class consisting of hydrogen, alkyl, aryl and arylalkyl.

According to the present invention, compounds of the above formulae are obtained as a mixture of the equilibrants by treating an ester of a 2-(4' - carboxy - butylidene) - 3 - isonitroso - 4-acylamido-tetrahydrothiophene with an acylating-reducing agent such as a mixture of zinc, a lower aliphatic acid and a lower aliphatic acid anhydride whereby the 3-isonitroso substituent is simultaneously reduced by nascent hydrogen resulting from interaction of the zinc and the acid, and acylated by the acid anhydride. The corresponding acids are obtained from the esters by saponification followed by treatment with an acid.

The starting materials used in practicing the process according to this invention, namely the esters of 2-(4'-carboxy-butylidene)-3-isonitroso-4-acylamido-tetrahydrothiophene, can be obtained by the chemical reactions indicated above and described in detail in concurrently filed applications Serial Nos. 554,458, 554,449, now Patent 2,437,719, 554,450, 554,451, 554,452 and 554,453. These equilibrants can be converted, by operations indicated above and described in concurrently filed applications Serial Nos. 554,455, 554,456 and 554,457, into the vitamin biotin.

Inasmuch as the 4-acylamido substituent of the starting material used in practicing the process according to this invention remains unaffected by the process wherein the products according to the invention are obtained, it is evident that usual simple 4-acylamido substituted compound of that type can be used, for example the following can be employed in the present process:

2-(4' - carboxy - butylidene) - 3 - isonitroso - 4-acetamido-tetrahydrothiophene esters
2-(4' - carboxy - butylidene) - 3 - isonitroso - 4-propanamidotetrahydrothiophene esters
2-(4' - carboxy - butylidene) - 3 - isonitroso - 4-benzamidotetrahydrothiophene esters.

Likewise variation in the ester group does not affect materially the course of the reaction; methyl, ethyl, propyl, butyl, or other lower alkyl, and phenyl, benzyl and other aryl and arylalkyl esters can be used satisfactorily.

The following example illustrates a method of carrying out the present invention, but it is to be understood that this example is given by way of illustration and not of limitation.

*Example*

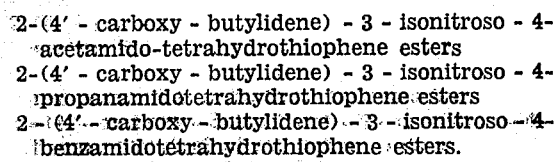

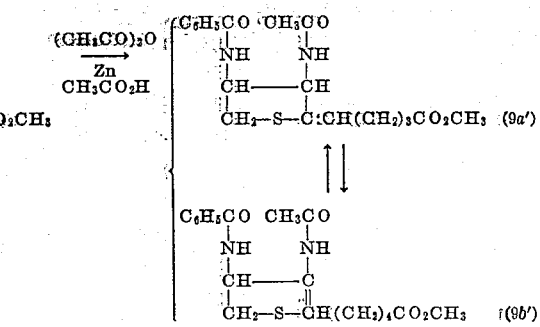

About 10 g. of zinc dust is slowly added, with agitation to a cold mixture of 50 cc. of acetic anhydride, 50 cc. of glacial acetic acid, and about 3.2 g. of 2-(4'-carbomethoxy-butylidene)-3-isonitroso-4-benzamido-tetrahydrothiophene and agitation of the mixture is continued for about 16 hours thereafter, the temperature of the reaction mixture being permitted to rise gradually to about room temperature. Zinc particles in the mixture are then removed, and the solution is evaporated under diminished pressure to obtain a white residue. This residue is suspended in water, warmed to about 50° C. to decompose any remaining acetic anhydride, cooled and acidified to congo with hydrochloric acid resulting in the precipitation of crude 2-(4'-carbomethoxy-butylidene)-3-acetamido-4-benzamido-tetrahydrothiophene (9a') together with its corresponding equilibrant; 2-(4'-carbomethoxy-butyl)-3-acetamido-4-benzamido-4:5-dihydrothiophene (9b'). This crude product is removed and purified by known methods.

The crude mixture obtained as a product above comprises a mixture of two stereoisomeric racemates, which when fractionally crystallized from methanol yields a first racemic mixture (M. P. 185–186° C.) corresponding to Formula 9b' above, and a relatively more soluble second racemic mixture (M. P. 162–163° C.) corresponding to Formula 9a' above.

By saponifying 2-(4'-carbomethoxy-butylidene)-3-acetamido - 4 - benzamido - tetrahydrothiophene or its equilibrant with warm alkali in aqueous alcohol, followed by acidification of the mixture, the corresponding acid, 2-(4'-carboxybutylidene) - 3-acetamido- 4 -benzamido - tetrahydrothiophene or its equilibrant is obtained. The first racemate when thus treated yields a first racemic acid mixture (M. P. 177° C.); the second racemate yields a second racemic acid mixture (M. P. 207° C.).

Modifications may be made in carrying out the present invention without departing from the spirit and scope thereof and the invention is to be limited only by the appended claims.

What is claimed is:

1. 2-(4-carboxy butyl)-3-acetamido-4-benzamido-4:5-dihydrothiophene.

2. dl-2-(4'-carbomethoxy-butyl)-3-acetamido-4-benzamido-4:5-dihydro-thiophene, having a melting point of approximately 185–186° C.

3. 2-(4' - carboalkoxy - butyl) - 3 : 4 - di(acylamido)-4:5-dihydrothiophenes.

4. 2-(4'-carboaroxy-butyl)-3:4-di(acylamido)-4:5-dihydrothiophenes.

5. 2-(4'-carboaralkoxy - butyl)-3 : 4 - di(acylamido)-4:5-dihydrothiophenes.

6. 2 - (4'-carbomethoxy - butyl)-3:4 - di(acylamido)-4:5-dihydrothiophenes.

7. 2-(4'-carbomethoxy-butyl)-3-acetamido-4-benzamido-4:5-dihydrothiophene.

8. Dihydrothiophene compounds having the formula:

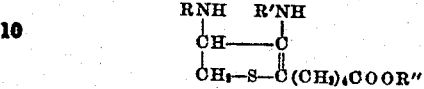

wherein R and R' are acyl radicals and R" is a radical selected from the class which consists of hydrogen, alkyl, aryl, and aralkyl radicals.

STANTON A. HARRIS.
GLEN E. ARTH.

REFERENCES CITED

The following references are of record in the file of this patent:

Whitmore "Organic Chemistry" 1937, pages 187 and 191.